United States Patent
Kojima

(10) Patent No.: US 12,436,184 B2
(45) Date of Patent: Oct. 7, 2025

(54) TEST BOARD INCLUDING TEST EXECUTABLE INTEGRATED CIRCUIT FOR TESTING A DEVICE UNDER TEST, AND DIAGNOSTIC SYSTEM, DIAGNOSTIC METHOD, AND NON-TRANSITORY COMPUTER-READABLE STORAGE MEDIUM STORING DIAGNOSTIC PROGRAM OF THE TEST BOARD

(71) Applicant: Kioxia Corporation, Tokyo (JP)

(72) Inventor: Tetsuharu Kojima, Tokyo (JP)

(73) Assignee: Kioxia Corporation, Tokyo (JP)

( * ) Notice: Subject to any disclaimer, the term of this patent is extended or adjusted under 35 U.S.C. 154(b) by 211 days.

(21) Appl. No.: 18/331,596

(22) Filed: Jun. 8, 2023

(65) Prior Publication Data

US 2024/0077530 A1 Mar. 7, 2024

(30) Foreign Application Priority Data

Sep. 1, 2022 (JP) ................. 2022-139236

(51) Int. Cl.
*G01R 31/28* (2006.01)
*G01R 1/04* (2006.01)

(52) U.S. Cl.
CPC ....... *G01R 31/2868* (2013.01); *G01R 1/0458* (2013.01); *G01R 31/2879* (2013.01)

(58) Field of Classification Search
CPC .............. G01R 1/0483; G01R 31/2886; G01R 31/2601; G01R 31/26; G01R 31/2868; G01R 31/2856; G01R 31/2642; G01R 31/2889; G01R 31/2855; G01R 31/2896; G01R 31/2851; G01R 1/07378; G01R 31/00; G01R 31/309; G01R 1/0441; G01R 31/318513; G01R 31/3187; G01R 31/318555; G01R 31/318563; G01R 1/06794; G01R 31/70; G01R 31/31903; G01R 31/31912; G01R 31/31915;

(Continued)

(56) References Cited

U.S. PATENT DOCUMENTS 6,119,255 A * 9/2000 Akram ............... G01R 31/2862
714/724
7,345,495 B2 * 3/2008 Dangelo ............ G01R 31/2863
324/750.06

(Continued)

FOREIGN PATENT DOCUMENTS

| JP | H10293156 A | 11/1998 |
| JP | 2001124821 A | 5/2001 |
| JP | 2022028084 A | 2/2022 |

*Primary Examiner* — Vinh P Nguyen
(74) *Attorney, Agent, or Firm* — Holtz, Holtz & Volek PC

(57) ABSTRACT

A test board, on which a test executable integrated circuit configured to execute a test of a device under test is mounted, includes a first input/output terminal, a second input/output terminal, and a contact unit. The first input/output terminal connects a first measuring apparatus capable of supplying electric power to the test board and controlling the test executable integrated circuit. The second input/output terminal connects a second measuring apparatus capable of measuring electrical characteristics of the test executable integrated circuit. The contact unit is mounted on the test board through the second input/output terminal and is capable of electrically connecting the second measuring apparatus.

20 Claims, 14 Drawing Sheets

(58) Field of Classification Search
CPC .... H01R 2201/20; H01R 33/76; H01R 12/73; H01R 13/665; G06F 30/398; G06F 11/2273; G06F 11/2205; G06F 11/27; G06F 2119/02; G06F 1/184
See application file for complete search history.

(56) References Cited

U.S. PATENT DOCUMENTS

| | | | |
|---|---|---|---|
| 10,732,219 B2* | 8/2020 | Song | G01R 31/2875 |
| 11,385,284 B2* | 7/2022 | Hayasaka | G01R 31/2834 |
| 11,536,766 B2* | 12/2022 | Yun | G01R 31/2879 |
| 11,828,791 B2* | 11/2023 | Song | G01R 31/2879 |
| 12,146,910 B2* | 11/2024 | Nakahara | G11C 29/06 |
| 2021/0199694 A1 | 7/2021 | Sakai et al. | |

* cited by examiner

FIG. 7

| TARGET SoC | ROW SELECTION | COLUMN SELECTION | SELECTED SoC | APPLIED PROCESS |
|---|---|---|---|---|
| SoC_1 | 1 | 1 | SoC_1 | — |
| | 1 | 2 | SoC_2 | HiZ PROCESS |
| | 1 | 3 | SoC_3 | HiZ PROCESS |
| | ... | | | |
| | 3 | 4 | SoC_14 | HiZ PROCESS |
| | 3 | 5 | SoC_15 | HiZ PROCESS |
| SoC_2 | 1 | 1 | SoC_1 | HiZ PROCESS |
| | 1 | 2 | SoC_2 | — |
| | 1 | 3 | SoC_3 | HiZ PROCESS |
| | ... | | | |
| | 3 | 4 | SoC_14 | HiZ PROCESS |
| | 3 | 5 | SoC_15 | HiZ PROCESS |
| ... | | | | |
| SoC_15 | 1 | 1 | SoC_1 | HiZ PROCESS |
| | 1 | 2 | SoC_2 | HiZ PROCESS |
| | 1 | 3 | SoC_3 | HiZ PROCESS |
| | ... | | | |
| | 3 | 4 | SoC_14 | HiZ PROCESS |
| | 3 | 5 | SoC_15 | — |

TEST BOARD INCLUDING TEST EXECUTABLE INTEGRATED CIRCUIT FOR TESTING A DEVICE UNDER TEST, AND DIAGNOSTIC SYSTEM, DIAGNOSTIC METHOD, AND NON-TRANSITORY COMPUTER-READABLE STORAGE MEDIUM STORING DIAGNOSTIC PROGRAM OF THE TEST BOARD

CROSS REFERENCE TO RELATED APPLICATIONS

This application is based upon and claims the benefit of priority from prior Japanese Patent Application No. P2022-139236 filed on Sep. 1, 2022, the entire contents of which are incorporated herein by reference.

FIELD

Embodiments described herein relate generally to a test board; and a diagnostic system, a diagnostic method, and a non-transitory computer-readable storage medium storing a diagnostic program of such a test board.

BACKGROUND

Semiconductor devices are subjected to stress tests for suppressing an occurrence of initial failures, reliability tests for verify reliability of products, and the like. Such stress tests include, for example, burn-in (BI) tests and the like, and such reliability tests include, for example, environmental tests, long-term life tests, and the like. In the burn-in tests, a burn-in board (BI board) is used as a test board on which a plurality of semiconductor devices are mounted as devices under test (DUT).

BRIEF DESCRIPTION OF THE DRAWINGS

FIG. 7 is a schematic diagram illustrating an example of controlling the tri state buffer of each SoC when selecting the specific SoC illustrated in FIG. 6.

DETAILED DESCRIPTION

Figure 1:
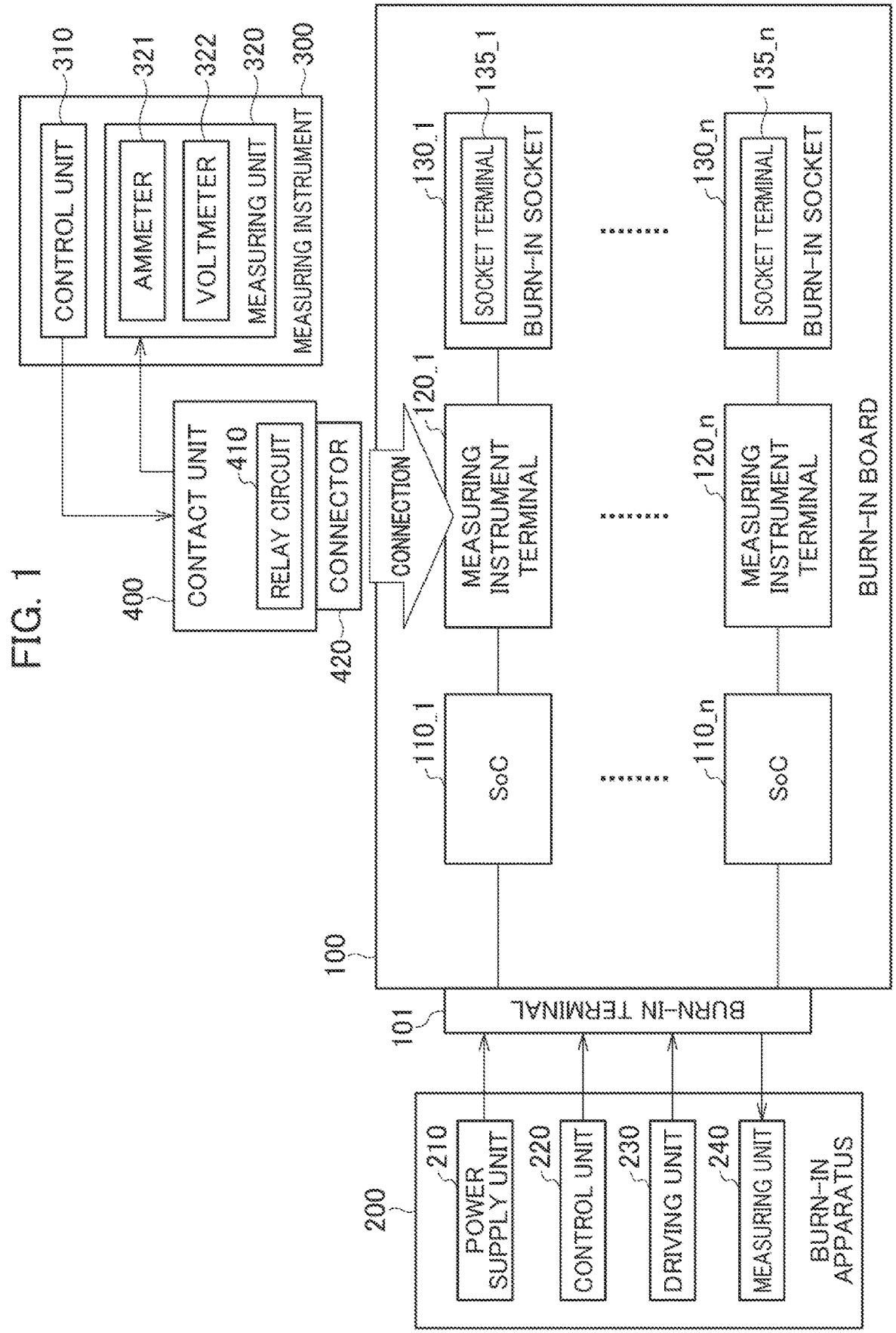
FIG. 1 is a block diagram schematically illustrating an example of a schematic structure of a diagnostic system of a burn-in board according to embodiments.

Next, certain embodiments will now be explained with reference to drawings. In the description of the following specification or drawings to be explained, the identical or similar reference sign is attached to the identical or similar part. However, the drawings are merely schematic. Moreover, the embodiments described hereinafter merely exemplify a device and/or a method for materializing the technical idea. The embodiments may be changed without departing from the spirit or scope of claims.

Certain embodiments provide a test board; and a diagnostic system, a diagnostic method, and a non-transitory computer-readable storage medium storing a diagnostic program of the test board, capable of diagnosing a test executable integrated circuit mounted on the test board.

According to one embodiment, a test board on which a device under test and a test executable integrated circuit configured to execute a test of the device under test are mounted, includes a first input/output terminal, a second input/output terminal, and a contact unit. The first input/output terminal connects a first measuring apparatus capable of supplying electric power to the test board and controlling the test executable integrated circuit. The second input/output terminal connects a second measuring apparatus capable of measuring electrical characteristics of the test executable integrated circuit. The contact unit is mounted on the test board through the second input/output terminal, and capable of electrically connecting the second measuring apparatus.

(Burn-In Test)

In recent memory products, speed of interfaces (IF) thereof has been improved, making it necessary to apply stress not only to memory cells but also to peripheral circuits thereof in burn-in tests. For this reason, a System-On-a-Chip (SoC) may be mounted as a test executable integrated circuit on a burn-in board, and tests may be performed with a high-speed IF through the SoC. In such an SoC-mounted burn-in board, it is also necessary to perform diagnostics for guaranteeing an operation of the SoC itself mounted on the burn-in board.

In semiconductor devices, such as semiconductor memories, devices have been evaluated from various aspects under various test conditions before being shipped to the market in order to avoid market defects. For example, there have been performed a burn-in test for suppressing occurrence of an initial failures generating, a reliability test for verifying reliability of products, and the like.

In a general burn-in test of memory products, a test board (e.g., a burn-in board) on which a device under test (DUT) is mounted is set in a test apparatus (e.g., a burn-in apparatus), and stresses, such as a voltage stress and a thermal stress, are continuously applying to the DUT mounted on the burn-in board. The time required for the test (i.e., test time) is generally long, from several hours to several tens of hours. Accordingly, the time occupied by the burn-in apparatus and the burn-in board becomes longer, and the cost also increases. Therefore, such a burn-in apparatus and such a burn-in board have a configuration capable of simultaneously burn-in of a large number of the DUTs. In such a configuration, DUT's control and data lines are shared among a plurality of DUTs. As a result, a load on the DUT increases, the time required for a driver (driving unit) provided in the burn-in apparatus to drive the DUT increases, and the test time also increases. More specifically, since a single driving unit provided in the burn-in apparatus must drive a large number of DUTs in the burn-in test, the rise time of each of the DUTs is slower and the transition time is longer than those in a case where a single driving unit drives a single DUT.

Moreover, in recent memory products, peripheral circuits have also been more complicated as the speed of interfaces has improved. As a result, there have been an increasing number of cases of early failure of such peripheral circuits. For example, wiring disconnection caused by step have become a problem in buffer circuits of high-speed interfaces. Therefore, it has become necessary to apply stresses not only to the memory cells but also to peripheral circuits (for example, output stage) thereof, in the burn-in test process.

In such cases, since the test speed cannot be increased in a burn-in test using a normal burn-in board, a burn-in board on which a test executable integrated circuit, such as an SoC, is mounted is used. The SoC is, for example, an Application-Specific Integrated Circuit (ASIC), a Field Programmable Gate Array (FPGA), or the like for executing tests on a DUT.

The SoC is an integrated circuit for inspecting the DUT, and, for example, if the DUT is a memory device, the SoC is a memory controller. However, since the SoC merely needs to control the memory device, the SoC itself does not necessarily need to mount a CPU thereon.

Test items for DUTs executed by the SoCs include an electrical conductivity test, a DC test, a functional test, an AC test, a SCAN test (structural test), a power supply-related test, and the like. If the DUT is an NAND flash memory, cell tests of the NAND memory include: a Pass/Fail test, such as SLC (1 bit/cell), MLC (2 bits/cell), TLC (3 bits/cell), and QLC (4 bits/cell); a test acceptable of a certain error as an error bit test;

a fail bit count test exceeding an ECC correction capability required for the cell test as a fail bit count test; an Okay/No-Good determination test of tPROG criteria as a tPROG criteria test, and the like.

Since such an SoC-mounted burn-in board tests the DUT through the mounted SoC, it can be tested with a high speed interface. It is to be noted that since the SoC and the DUT are connected one-to-one, the load thereof is reduced and testing can be executed at higher speeds. However, the higher the test speed, the shorter the distance between each SoC and each DUT must be, so the SoC must inevitably be mounted near the DUT.

However, if the SoC is mounted near the DUT during the burn-in test, the SoC is also subjected to a thermal stress in a chamber, such as a thermostatic oven. A mechanism so as to isolate the SoC from the thermal stress of the chamber may not be adopted since the cost of the burn-in apparatus increases. In such cases, since the SoC may also be subjected to the thermal stress, it is necessary to verify in advance that the SoC normally operates before executing the burn-in test.

Thus, in the case of adopting the SoC-mounted burn-in board, it is required to diagnose the SoC-mounted burn-in board in order to guarantee the operation of the SoC mounted on the board. More specifically, semiconductor components are generally deteriorated in performance over time even if the semiconductor components are used within a guaranteed operating temperature range. Moreover, since the degree of deterioration must not affect burn-in test results, it is necessary to verify whether or not the SoC has a proper performance capable of guaranteeing the test.

When executing a screening of initial failures of semiconductor devices, a measuring instrument capable of measuring electric current and voltage, such as a tester, is generally used. However, such burn-in apparatuses generally do not have a mechanism so as to measure an electrical quantity of the burn-in board. This is because the burn-in test itself does not require such a measuring instrument, or because the wirings are shared between a large number of the SoCs, as above-mentioned above, and therefore it cannot realize accurate measurement of the electric current and voltage in each SoC. Therefore, a measuring instrument capable of measuring the electric current and voltage such as a tester is required in order to diagnose the burn-in board.

(Diagnostic System in Embodiments)

The embodiments disclosed herein are used for diagnostics of test boards, such as a burn-in board, on which a test executable integrated circuits, such as SoC, is mounted. The term burn-in board diagnostics used herein means to accurately diagnose functions and performance of SoCs mounted on the burn-in board.

FIG. 1 schematically illustrates an example of a schematic structure of a diagnostic system of a burn-in board according to the embodiments. The diagnostic system according to the embodiments includes a burn-in board (e.g., a test board) 100, a burn-in apparatus (e.g., a first measuring apparatus) 200, a measuring instrument (e.g., a second measuring apparatus) 300, and a contact unit 400.

The diagnostic system in the embodiments is provided with a configuration for enabling on-board diagnostics of the burn-in board to guarantee an operation of an SoC(s) 110 in order to enable a burn-in test at high-speed IF, in the burn-in board 100 on which the SoC 110 is mounted. The contact unit 400 capable of electrically connecting the measuring instrument 300 is provided on a substrate of the SoC-mounted burn-in board 100, and all pins of the SoC 110 are exposed as a metallic terminal on the substrate surface of the burn-in board 100 on the substrate around the SoC 110 of the burn-in board 100 so as to be electrically connected to each pin of the SoC 110.

In other words, as illustrated in FIG. 1, the diagnostic system in the embodiments includes: a burn-in board 100 on which a device under test (DUT) is mounted; a test executable integrated circuit (SoC) 110 (110_1, . . . , 110_n) mounted on the burn-in board 100 to test the DUT; a burn-in apparatus 200 capable of supplying power to the burn-in board 100 and controlling the SoC 110; measuring instrument 300 capable of measuring electrical characteristics of the SoC 110; and a contact unit 400 mounted on the burn-in board 100 and capable of electrically connecting the measuring instrument 300 to the SoC. The burn-in apparatus 200 is capable of supplying power to the burn-in board 100 and controlling the SoC 110 mounted on the burn-in board 100.

The diagnostic system in the embodiments is provided with a configuration capable of connecting the measuring instrument 300 capable of executing an electrical inspection in the immediate vicinity of the SoC 110 on the substrate of the SoC-mounted burn-in board 100, and thereby the measuring instrument 300 can accurately measure an electrical quantity of only the SoC 110.

Moreover, the diagnostic system in the embodiments is provided with a configuration for electrically isolating each SoC 110 even if control and data lines of a plurality of SoC 110_1, ..., 110_n are shared, and thereby the electrical quantity of the individual SoC 110 can be accurately measured and functions of the SoC 110 can be accurately diagnosed.

(Burn-In Board)

The burn-in board 100 is a test board on which a device under test (DUT) (not illustrated)) and a test executable integrated circuit (e.g., SoC) 110 (110_1, ..., 110_n) configured to execute a test of the DUT is mounted. The burn-in board 100 includes a burn-in terminal (e.g., first input/output terminal) 101, n SoCs 110 (110_1, ..., 110_n), n measuring instrument terminals (e.g., second input/output terminals) 120 (120_1, ..., 120_n), and n burn-in sockets 130 (130_1, ..., 130_n) each of which includes a burn-in socket input/output terminal (e.g., third input/output terminal) 135 (135_1, ..., 135_n). The variable n used herein is an integer greater than or equal to 1.

The SoC 110 and the measuring instrument terminal 120 are provided for each burn-in socket 130. That is, the SoC 110_1 and the measuring instrument terminal 120_1 are mounted corresponding to the burn-in socket 130_1, and the SoC 110_n and the measuring instrument terminal 120_n are mounted corresponding to the burn-in socket 130_n. The DUT is mounted on the burn-in board 100 being inserted into the burn-in socket input/output terminal 135 (also simply referred to as "socket terminal 135" in the drawings) of the burn-in socket 130.

The burn-in terminal 101 is a terminal for connecting, to the burn-in board 100, the burn-in apparatus 200 capable of supplying power to the burn-in board 100 and controlling the SoC.

The measuring instrument terminal 120 is an input/output terminal for connecting, to the burn-in board 100, the measuring instruments 300, such as a tester, capable of measuring electrical characteristics of the SoC 110.

The measuring instrument terminal 120 is mounted on the substrate surface of the burn-in board 100 and includes a metallic terminal 125 electrically connected to a mounted pin of an SoC 110. The mounted pin of the SoC 110 may include all pins of the SoC 110. The metallic terminal(s) 125 is electrically connected to all input/output pins and power supply pin terminal of the SoC 110. All input/output pins that are a mounted pins of the SoC 110 are connected to a tri state buffer 115 (illustrated in FIG. 4).

The contact unit 400 is mounted on the burn-in board 100 through the measuring instrument terminal 120 and allows the measuring instrument 300 to be electrically connected to the burn-in board 100. The contact unit 400 is capable of connecting or disconnecting all pins of the SoC 110 to or from measuring instrument 300.

The SoC 110 mounted on the burn-in board 100 can be electrically inspected. Moreover, a plurality of SoCs 110 (110_1, ..., 110_n) mounted on the burn-in board 100 can be electrically inspected simultaneously.

(Burn-In Apparatus)

As illustrated in FIG. 1, the burn-in apparatus 200 includes a power supply unit 210, a control unit 220, a driving unit 230, and a measuring unit 240.

The control unit 220 executes control of each unit in burn-in apparatus 200, i.e., the power supply unit 210, the driving unit 230, the measuring unit 240, and the like, and also executes control of the burn-in board 100 side through the burn-in terminal 101.

The power supply unit 210 supplies electric power to the DUT inserted into the burn-in socket input/output terminal 135 on the burn-in board 100 and the SoC 110 mounted on the burn-in board 100, during the burn-in test. Moreover, also during the diagnostics of the burn-in board, the power supply unit 210 can supply electric power to the DUT inserted into the burn-in socket input/output terminal 135 and the SoC 110 mounted on the burn-in board 100, and the contact unit 400 connected to the measuring instrument terminal 120. Alternatively, during the diagnostics of the burn-in board, electric power may be supplied from the measuring instrument 300 side, through the contact unit 400, to the DUT inserted into the burn-in socket input/output terminal 135 and the SoC 110 mounted on the burn-in board 100.

The driving unit 230 is configured to drive the SoC 110 mounted on the burn-in board 100, and the contact unit 400 during the burn-in test. More specifically, a normal burn-in board on which no SoC 110 is mounted is configured so that a driving unit (driver) tests the DUT, but the burn-in board 100 on which the SoC 110 is mounted according to the embodiments is configured so that not a driving unit 230 but the SoC 100 tests the DUT. Therefore, in the embodiments, it is the SoC 110 and the contact unit 400 provided on the burn-in board 100 that are driven by the driving unit 230 in the burn-in apparatus. The DUT is not required during the diagnostics of the burn-in board 100 on which the SoC 110 is mounted.

The measuring unit 240 compares an input voltage with a threshold value of high/low level during the burn-in test.

(Measuring Instrument)

The measuring instrument 300 includes a control unit 310 and a measuring unit 320, as illustrated in FIG. 1. The measuring unit 320 includes an ammeter 321 and a voltmeter 322.

The control unit 310 controls the measuring unit 320 provided in the measuring instrument 300 and also controls the contact unit 400 and the burn-in board 100 side through the contact unit 400.

The measuring unit 320 executes an electrical inspection and the like for guaranteeing an operation of the SoC 110 mounted on the substrate of the burn-in board 100. The electrical inspection includes, for example, a direct current (DC) test, a functional test, and the like. The measuring instrument 300 includes general-purpose measuring instruments, such as a tester, a voltage and current measuring device, an oscilloscope, and a pulse generator, for example.

(Contact Unit)

The contact unit 400 includes a relay circuit 410 and a connector 420, as illustrated in FIG. 1. The connector 420 is electrically connected to the measuring instrument terminal 120 (e.g., any one of the measuring instrument terminals 120_1, ..., 120_n) disposed on the substrate of the burn-in board 100.

The relay circuit 410 is configured so that each pin of the contact unit 400 can be connected to an electrical quantity metering pin of the measuring instrument 300. The contact unit 400 is a connecting component including a metallic terminal to be connected to the metallic terminal 125 at the side of the substrate of the burn-in board 100. The connector 420 of the contact unit 400 is, for example, a pogo pin or a male/female connector. It is to be noted that depending on the measuring instrument 300, a driver pin, an input-output (IO) pin, and a direct current (DC) measuring pin may be separated from each other, and therefore, the relay circuit 410 has a role of changing a signal path depending on, for example, whether passing a normal test signal or making a DC measurement.

(Layout of Burn-In Board)

Figure 2:
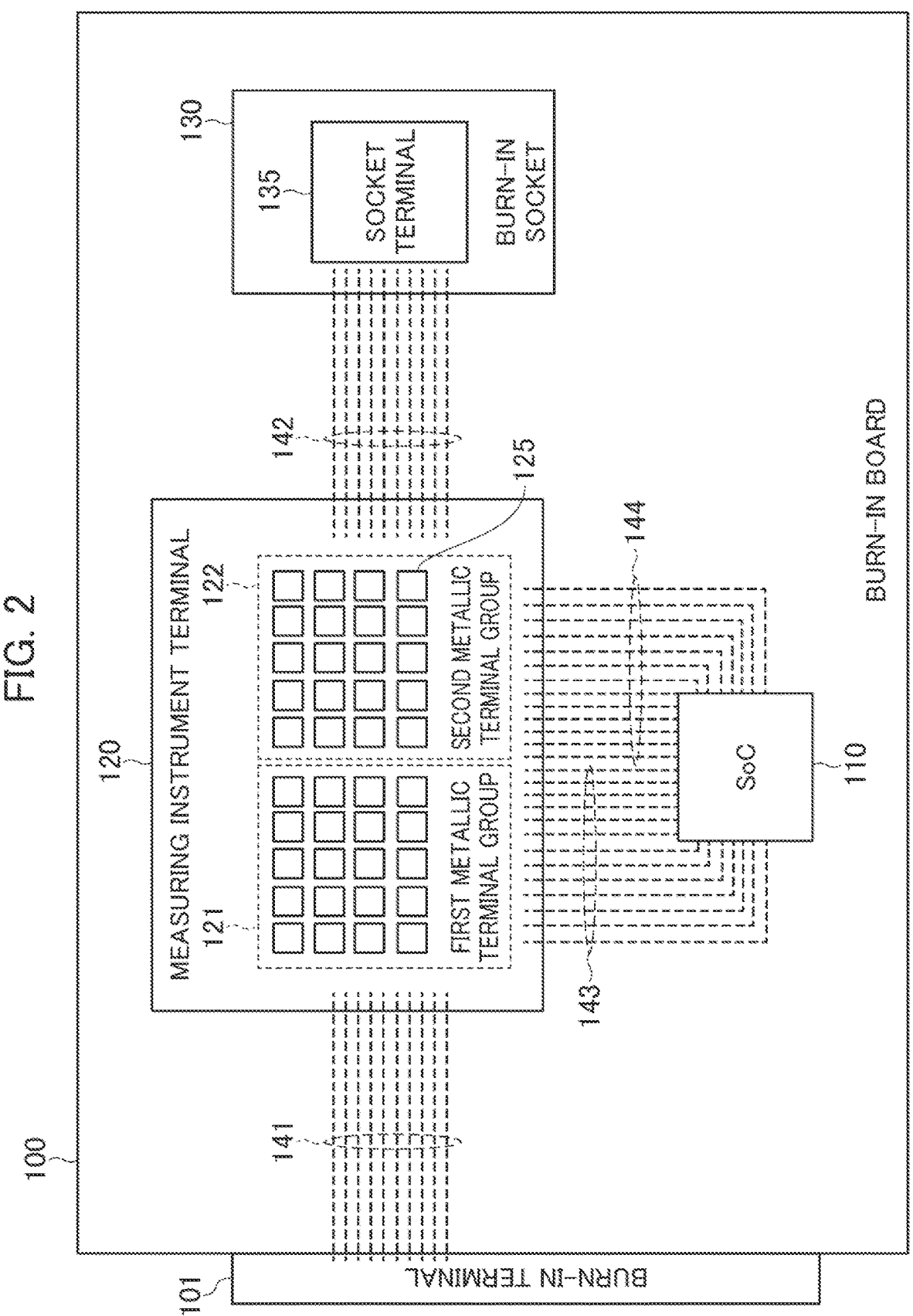
FIG. 2 is a block diagram illustrating a layout example of the burn-in board according to the embodiments.

FIG. 2 illustrates an example of a layout of the burn-in board 100 according to the embodiments. For simplicity of explanation, FIG. 2 illustrates a single SoC 110 and a single measuring instrument terminal 120, corresponding to a single burn-in socket 130.

As illustrated in FIG. 2, all pins of the SoC 110 are exposed as a metallic terminal 125 on the substrate around the SoC 110 of the burn-in board 100 so that each pin of the SoC 110 can be electrically connected to the contact unit 400. One metallic terminal 125 is arranged for one pin of the SoC 110.

If the SoC 110 is only to be inspected for Voltage Forward (VF) or other contact inspection from outside the burn-in board 100, only the signal pin among the pins of the SoC 110 may be used. However, when measuring a voltage on the signal pin of the SoC 110, since it is necessary to activate the SoC 110 by applying an electric current between an electric power source and a ground (GND) of the SoC 110, it is configured so that all pins, such as the power pin, GND pin, and signal pin, are exposed as metal terminal 125. A short circuit between pins of the SoC 110 can also be detected by exposing all pins of the SoC 110.

In the layout illustrated in FIG. 2, a pin group 143 at the side of the burn-in terminal 101 is exposed from the substrate of the burn-in board 100 as a first metallic terminal group 121, among all pins of the SoC 110. Moreover, a pin group 144 at the side of the burn-in socket input/output terminal 135 is exposed from the substrate of the burn-in board 100 as a second metallic terminal group 122, among all pins of the SoC 110.

A wiring group 141 between the first metallic terminal group 121 and the burn-in terminal 101, a wiring group 142 between the second metallic terminal group 122 and the burn-in socket input/output terminal 135, and the pin groups 143 and 144 can be configured as wirings embedded in the substrate of the burn-in board 100. Alternatively, the wiring group 141, the wiring group 142, and the pin groups 143 and 144 can also be configured as multi-layer wirings embedded in the substrate.

Each pin of the contact unit 400 is configured to be connectable to the electrical quantity measurement pin of the measuring instrument 300 by means of the relay circuit 410 of the contact unit 400, details of which will be described below.

Figure 3:
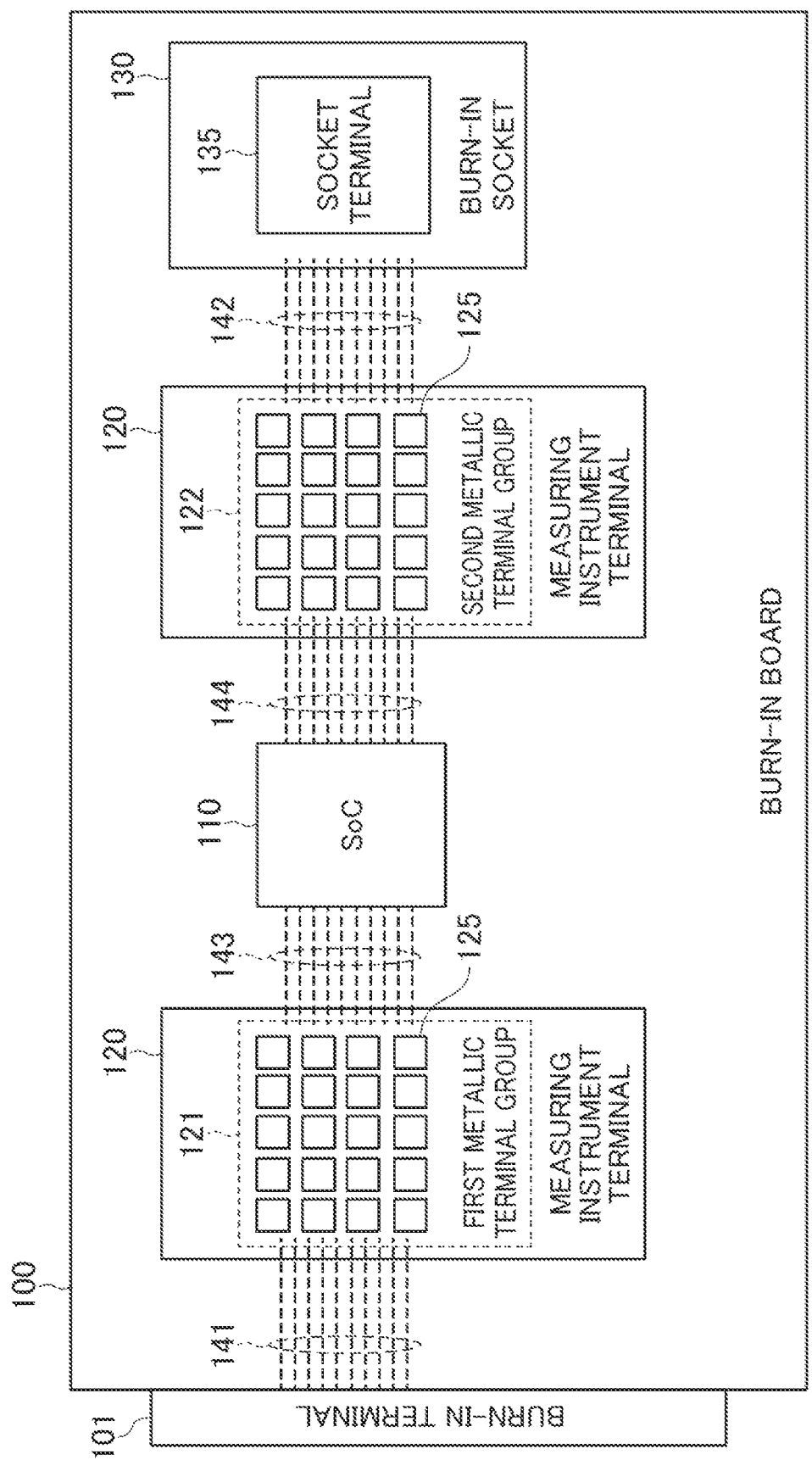
FIG. 3 is a block diagram illustrating another layout example of the burn-in board according to the embodiments.

FIG. 3 illustrates another example of a layout of the burn-in board 100 according to the embodiments. For simplicity of explanation, FIG. 3 illustrates a single SoC 110 and a single measuring instrument terminal 120, corresponding to a single burn-in socket 130.

As illustrated in FIG. 3, a measuring instrument terminal 120 from which a first metallic terminal group 121 connected to a pin group 143 at the side of a burn-in terminal 101 is exposed is arranged between the wiring group 141 between burn-in terminals 101 and the measuring instrument terminal and the SoC 110, and a measuring instrument terminal 120 from which a second metallic terminal group 122 connected to a pin group 144 at the side of the burn-in terminal 101 is exposed is arranged between the wiring group 142 between the burn-in socket input/output terminals 135 and the measuring instrument terminal and the SoC 110. The rest of the configurations of the layout example illustrated in FIG. 3 is the same as that of the layout example illustrated in FIG. 2.

(Tri State Buffer)

Figure 4:
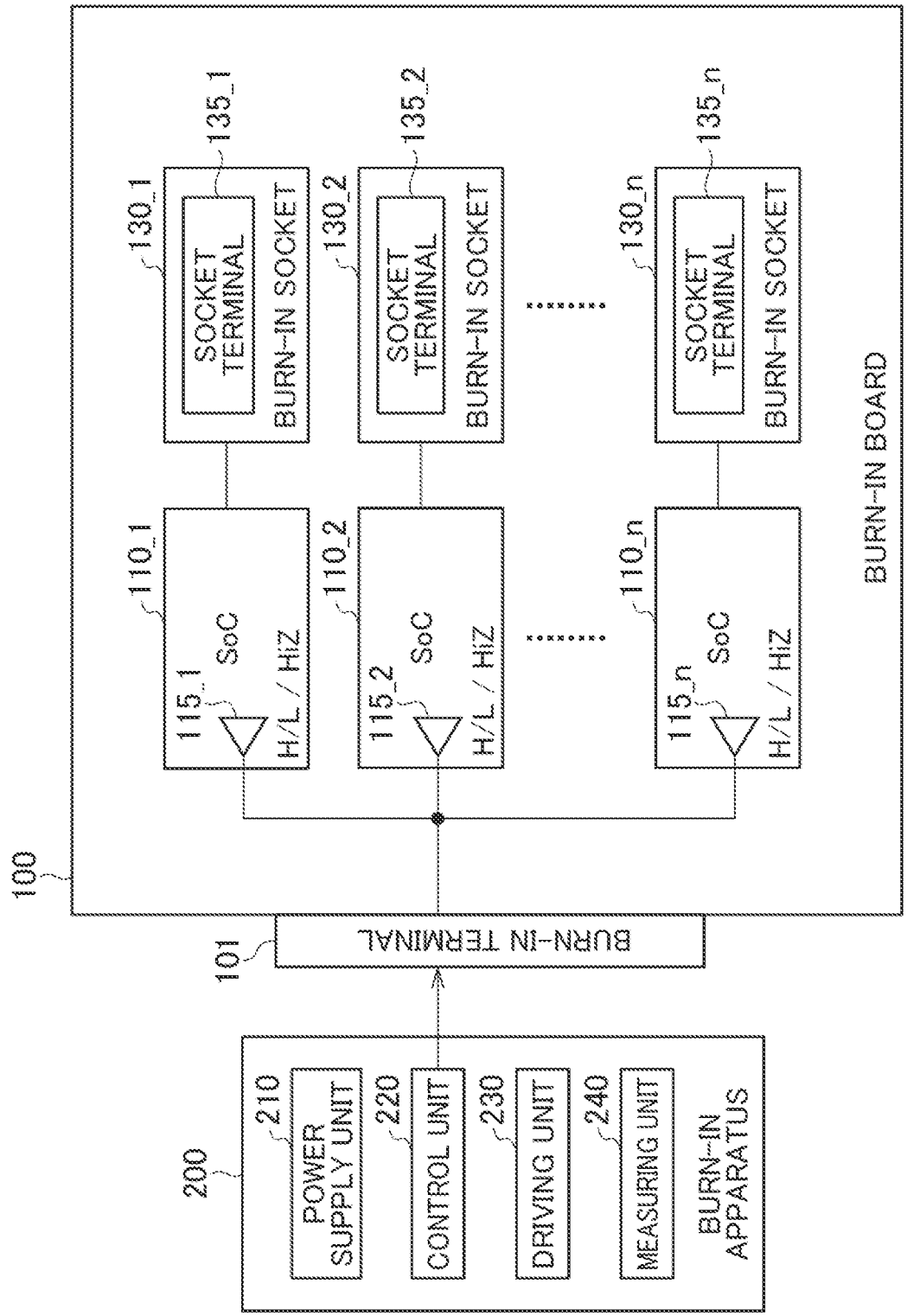
FIG. 4 is a block diagram illustrating an example in which each SoC mounted on the burn-in board according to the embodiments is provided with a tri state buffer.

FIG. 4 illustrates an example of providing tri state buffers 115_1, 115_2, . . . , 115_n respectively in SoC 110_1, 110_2, . . . , 110_n mounted on the burn-in board 100 according to the embodiments. In the example illustrated in FIG. 4, for simplicity of explanation, a tri state buffer 115 is disposed corresponding to a single pin being provided in each SoC 110, but the tri state buffer 115 is arranged for each of all pins of each SoC 110.

All pins of the SoC 110_1, 110_2, . . . , 110_n have respectively tri state buffers 115_1, 115_2, . . . , 115_n, and can control an output state of each pin from the control unit 220 in the burn-in apparatus 200. More specifically, a control signal of the SoC 110 is connected to the control unit 220 in the burn-in apparatus 200, and the tri state buffer 115 of the SoC 110 can be controlled to switch three output states, a high state, a low state, and a high impedance (HiZ) state by, for example, rewriting a control command, a register in the SoC 110, or the like. By switching the tri state buffer 115 provided in a non-measuring target SoC 110 to the high impedance state, such a non-measuring target SoC 110 can be disconnected therefrom. Consequently, even if the pin is shared, the electrical quantity of only the measuring target SoCs 110 can be measured.

(Diagnostic Method of Test Board)

There will now be described a diagnostic method of the burn-in board 100 on which the SoC 110 is mounted, in the diagnostic system according to the embodiments.

A diagnostic method of the burn-in board 100 on which the SoC 110 is mounted in the diagnostic system according to the embodiments includes: connecting the burn-in board 100 to a burn-in apparatus 200; supplying, by the burn-in apparatus 200, electric power to the burn-in board 100 and controlling the SoC 110 by the burn-in apparatus; measuring, by a measuring instrument 300, electrical characteristics of the SoC 110; and mounting, on the burn-in board 100, a contact unit 400 capable of electrically connecting the measuring instrument 300 to the SoC.

It is to be noted that the processing operations of the diagnostic method of the burn-in board 100 in the diagnostic system according to the embodiments can also be described in a computer program as instructions to be executed by computers.

Figure 5:
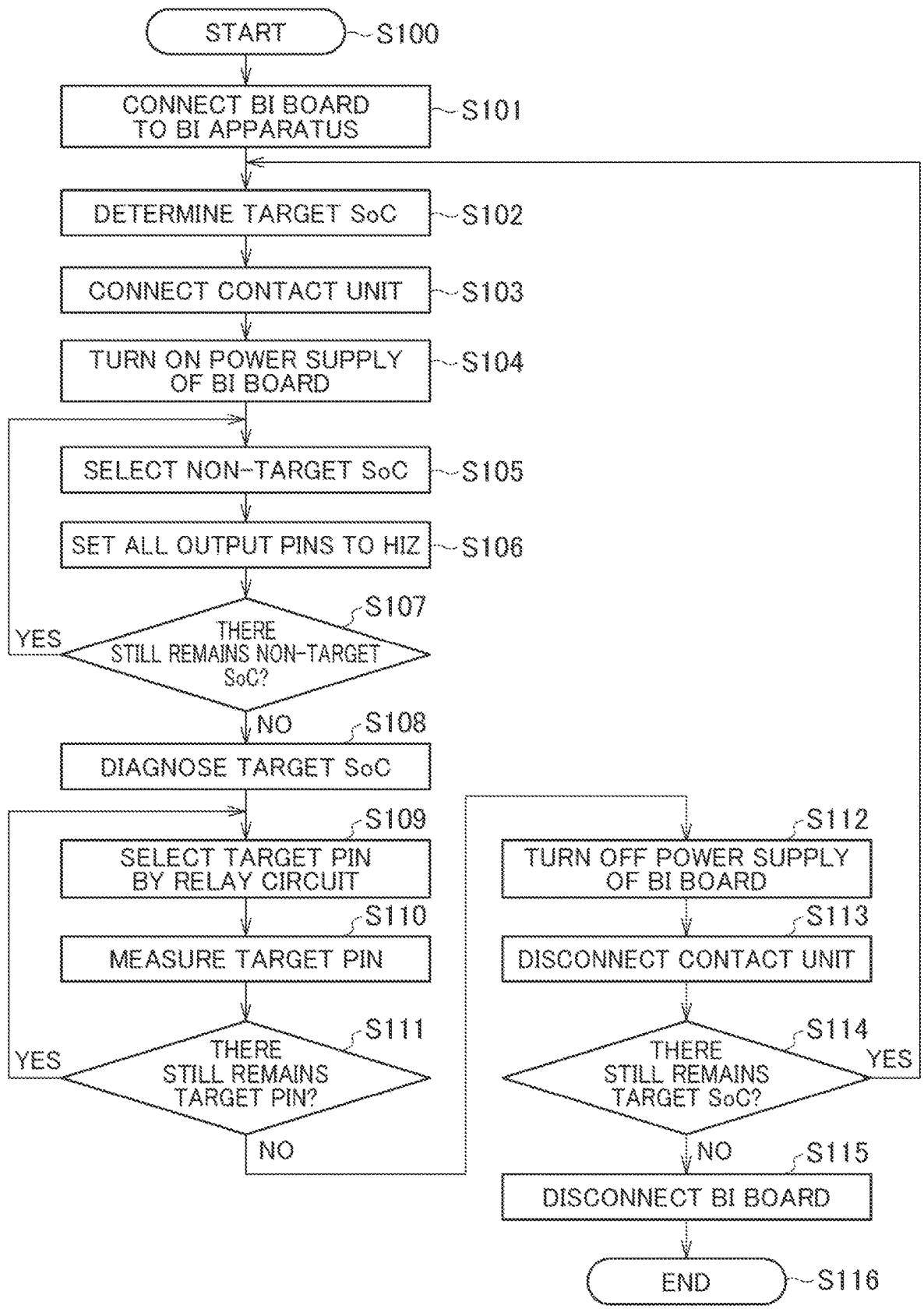
FIG. 5 is a flow chart which illustrates a processing operation example of a diagnostic method of a burn-in board on which SoCs are mounted, in a diagnostic system of the burn-in board according to the embodiments.

FIG. 5 illustrates an example of a processing operation of the diagnostic method of the burn-in board 100 on which the SoC 110 is mounted, in the diagnostic system according to the embodiments.

In Step S101, the burn-in board 100 is connected to the burn-in apparatus 200.

In Step S102, an SoC 110 to be test target (i.e., to be under test) among the SoCs 110_1 to 110_n respectively inserted into the burn-in socket input/output terminals 135_1 to 135_n mounted on the burn-in board 100 is determined.

In Step S103, the contact unit 400 to which the measuring instrument 300 is connected is automatically or manually connected to the nearest measuring instrument terminal 120 of the test target SoC 110 (i.e., measuring instrument terminal 120 mounted corresponding to the test target SoC 110). The connection of the contact unit 400 to the measuring instrument terminal 120 in Step S103 means physically contacting the contact unit 400 connected to the measuring instrument 300 and the relay circuit 410 to the metallic terminal 125 of the measuring instrument terminal 120 on the burn-in board 100. The connection means is not limited in particular to an automatic operation by devices, such as a robot arm, or a manual operation by human resources.

In the embodiments, it is necessary for diagnostics of the SoC 110 to diagnose performance of an input/output pin of the SoC 110 in addition to the functional diagnostics inside the SoC 110. In particular, since the pin group 144 of the SoC 110 at the burn-in socket input/output terminal 135 side needs to have performance capable of high-speed testing, a pin output current is measured for determination of the performance diagnostics. Therefore, the connection of the measuring instrument is required for the performance diagnostics in the SoC 110.

In the embodiments, executing a "high-speed test" means that a frequency of the signal is high and therefore the switching time between high level and low level of the signal is short. However, when the load is heavy, such as when the signal line is shared among a plurality of DUTs, a delay may occur in switching between high level and low level. In such a case, the next high-level/low-level switching timing comes before the high-level/low-level is switched, and as a result, the high-speed test cannot be executed. The load causing this factor includes a capacity component and a resistance component The resistance component thereamong is dominated by an output resistance of an output buffer in the SoC 110, and measuring such a resistance value is used to determine whether or not the high-speed test can be executed. This resistance value can be calculated by apply a voltage to both ends of the resistance value and measuring an electric current which flows thereinto. Therefore, since the output resistance of the SoC 110 can be obtained by measuring the pin output current and then can be compared with the amount of load capable of executing the high-speed test (i.e., threshold value of diagnostics), thereby determining whether or not the high-speed test can be executed. Thus, a tester capable of high-speed IF connection is not necessary, since the measuring instrument 300 capable of DC measurement can determine whether or not the high-speed test can be executed.

In Step S104, electric power is supplied to the burn-in board 100 from the power supply unit 210 in the burn-in apparatus 200.

In Step S105, the control unit 220 in the burn-in apparatus 200 selects a non-diagnostic target SoC 110 of the SoCs 110 being mounted on the burn-in board 100.

In Step S106, the control unit 220 controls the share pin of the non-diagnostic target SoC 110 to shift to the HiZ state in order to disconnect the non-diagnostic target SoC 110 from the SoC group in which the control and data lines are shared. The shared lines of the burn-in board 100 are wired in two types, row and column, as the example illustrated in FIG. 6. Then, it is possible to control the diagnostic target SoC 110 (e.g., SoC 2 in the example in FIG. 6) by selecting rows and columns in accordance with a processing matrix illustrated to FIG. 7. In the example illustrated in FIG. 7, for example, when selecting the SoC 2, only the diagnostic target SoC 2 can be selected by switching non-diagnostic target SoCs 110 (e.g., SoC 1 and SoC 3 to SoC 15) except for the SoC 2, a combination of the row selection 1 and the column selection 2, to the HiZ state. It is to be noted that the selection order of the non-diagnostic target SoCs 110 does not matter for the processing matrix illustrated in FIG. 7. When newly switching to a diagnostic target SoC, the high impedance (HiZ) state can be canceled by turning off the electric power to the SoC 110.

In Step S107, the control unit 220 determines whether or not there are still any non-diagnostic target SoCs 110 remaining. As a result of determination of Step S107, if there are still non-diagnostic target SoCs 110 remaining, it returns to Step S105 and executes the processes in steps S105 to S106 with respect to the remaining non-diagnostic target SoC 110.

As a result of determination of Step S107, if there are no remaining non-diagnostic target SoC 110 (i.e., when all shared pins of the non-diagnostic target SoC is set to HiZ), it proceeds to Step S108.

In Step S108, a diagnostic target SoC 110 is selected in order to execute the diagnostics for the diagnostic target SoC 110.

In step S109, the relay circuit 410 of the contact unit 400 is used to connect the measurement pins of the measuring instrument 300 to the share pins of the diagnostic target SoC 110. In Step S110, the measuring instrument 300 measures an electrical quantity of only the shared line pin of the diagnostic target SoC 110.

Figure 8:
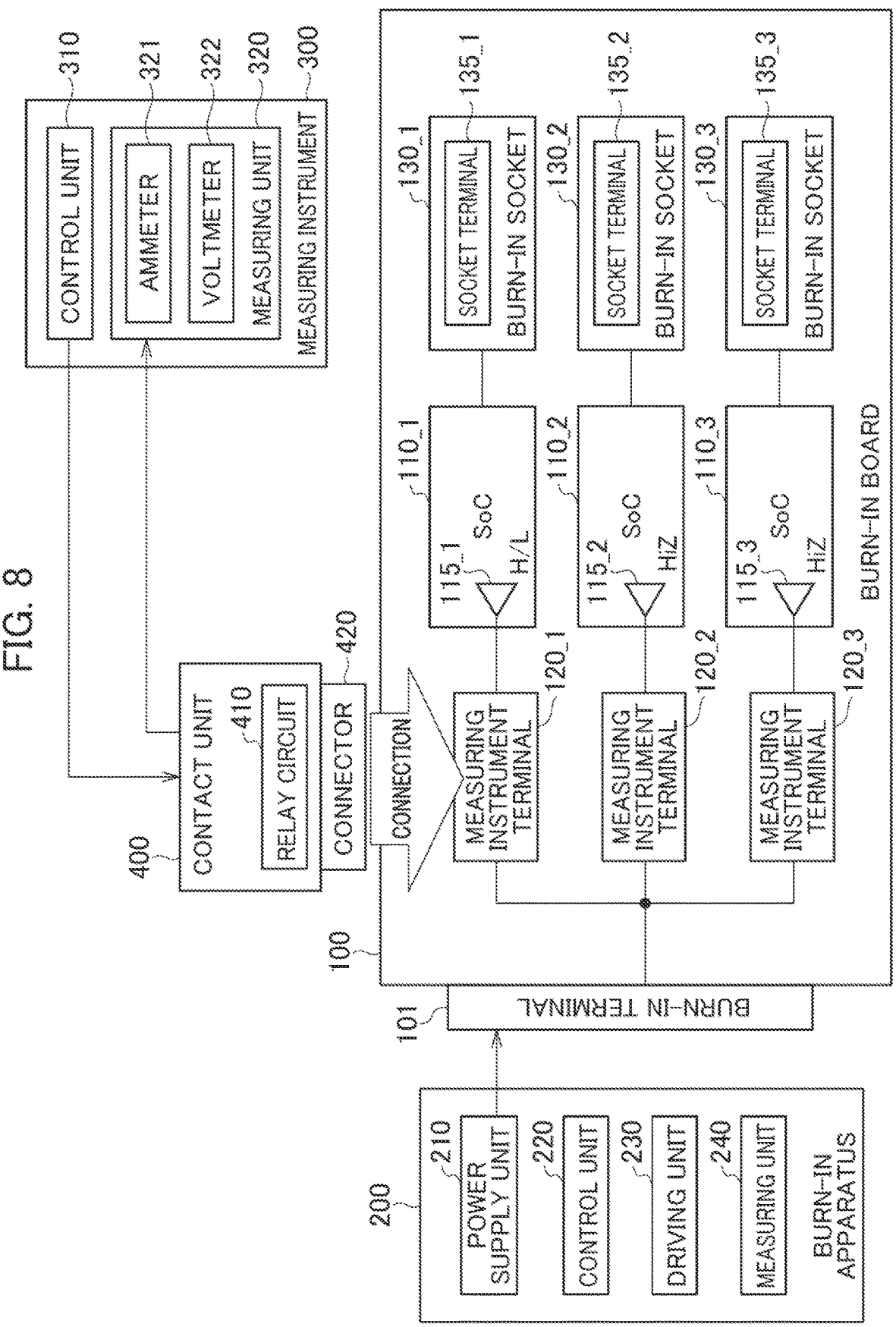
FIG. 8 is a block diagram for illustrating a processing operation example of selecting a specific SoC from an SoC group in which control lines and data lines are shared, in the diagnostic system of the burn-in board according to the embodiments.

FIG. 8 illustrates an example of diagnosing the performance of the burn-in terminal 101-side pin of the SoC 110_1 by selecting a specific SoC 110_1 from the group of the SoCs 110_1 to 110_3 in which the control and data lines are shared, in the diagnostic system according to the embodiments. In the example illustrated in FIG. 8, the tri state buffers 115_2 to 115_3 of the non-diagnostic target SoCs 110_2 to 110_3 are each in the high impedance state, and the electrical quantity of only the shared line pins of the diagnostic target SoC 110_1, where the tri state buffer 115_1 is in the high/low state, is measured by the measuring instrument 300.

Even if trying to measure the electrical quantity of the shared line pin of the diagnostic target SoC 110_1, without excluding the non-diagnostic target SoCs 110_2 to 110_3, it is not possible to accurately measure the electrical quantity of only the shared line pin of the SoC 110_1. In contrast, in the example illustrated in FIG. 8, the electrical quantity of only the shared line pin of the diagnostic target SoC 110_1 can be accurately measured, with excluding the non-diagnostic target SoCs 110_2 to 110_3.

Returning to FIG. 5, it is determined in Step S111 whether or not any of the measuring target pins still remain among the pins of the diagnostic target SoC 110. As a result of the determination of Step S111, if there are still measuring target pins remaining, it returns to Step S109 and executes the processes in Steps S109 to S110 with respect to the remaining measuring target pin.

As a result of the determination of Step S111, if there are no measuring target pin remaining, it proceeds to Step S112.

In Step S112, the electric power supply from the power supply unit 210 in the burn-in apparatus 200 to the burn-in board 100 is stopped.

In Step S113, the connected contact unit 400 to which the measuring instrument 300 is connected is automatically or manually disconnected from the measuring instrument terminal 120 of the test target SoC 110.

In Step S114, the control unit 220 determines whether or not there are still any non-diagnostic target SoCs 110 remaining. As a result of determination of Step S114, if there are still non-diagnostic target SoCs 110 remaining, it returns to Step S102 and executes the processes in Steps S102 to S113 with respect to the remaining non-diagnostic target SoC 110.

As a result of the determination of Step S114, if there are no non-diagnostic target SoCs remaining, it proceeds to Step S115.

In Step S115, the burn-in board 100 is disconnected from the burn-in apparatus 200.

Figure 9:
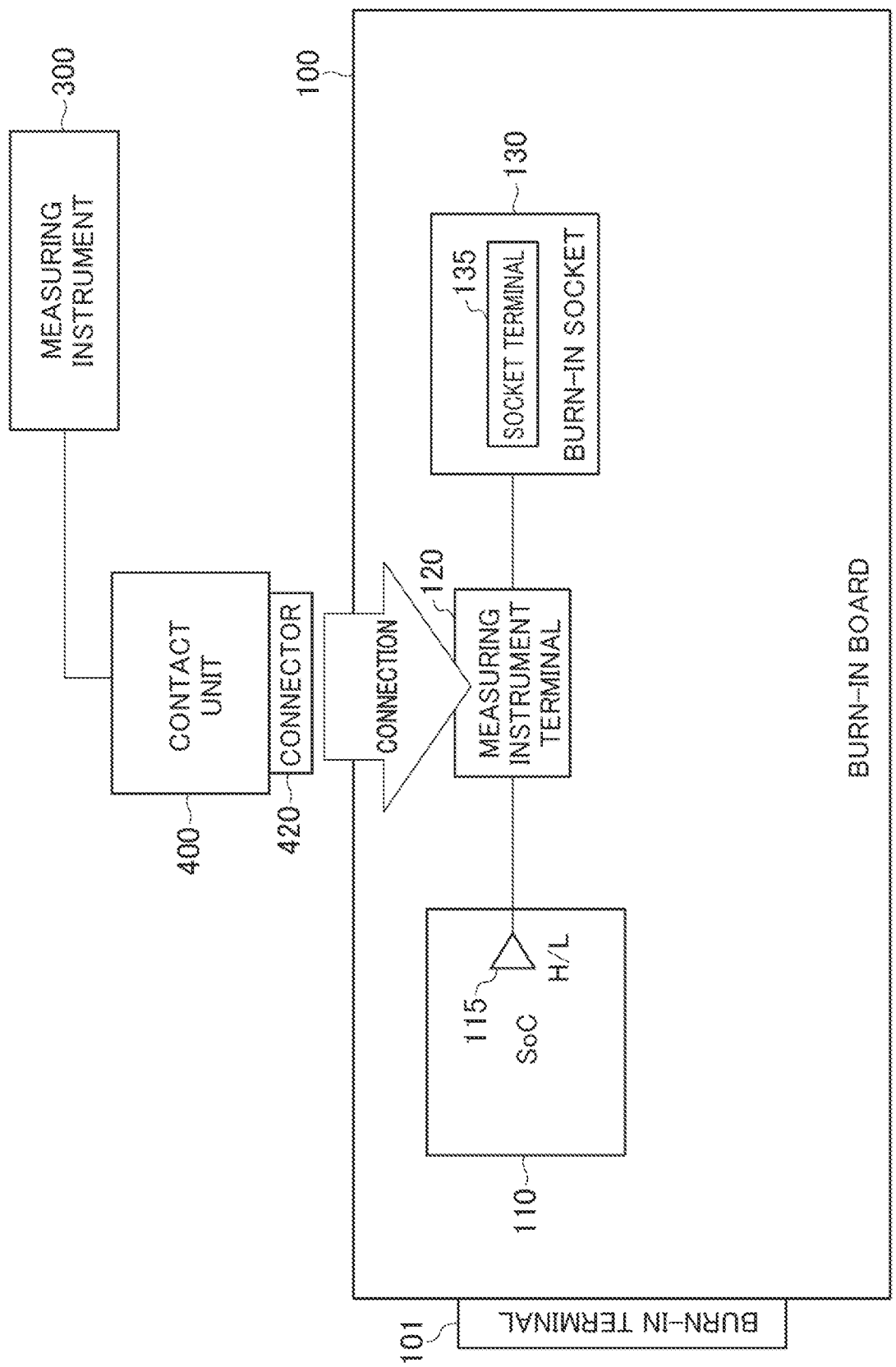
FIG. 9 is a block diagram for illustrating a processing operation example of measuring an electrical quantity of a burn-in socket-side pin of the SoC, in the diagnostic system of the burn-in board according to the embodiments.

FIG. 9 illustrates a processing operation example of measuring an electrical quantity of a burn-in socket 130-side pin of the SoC 110, in the diagnostic system according to the embodiments.

Figure 6:
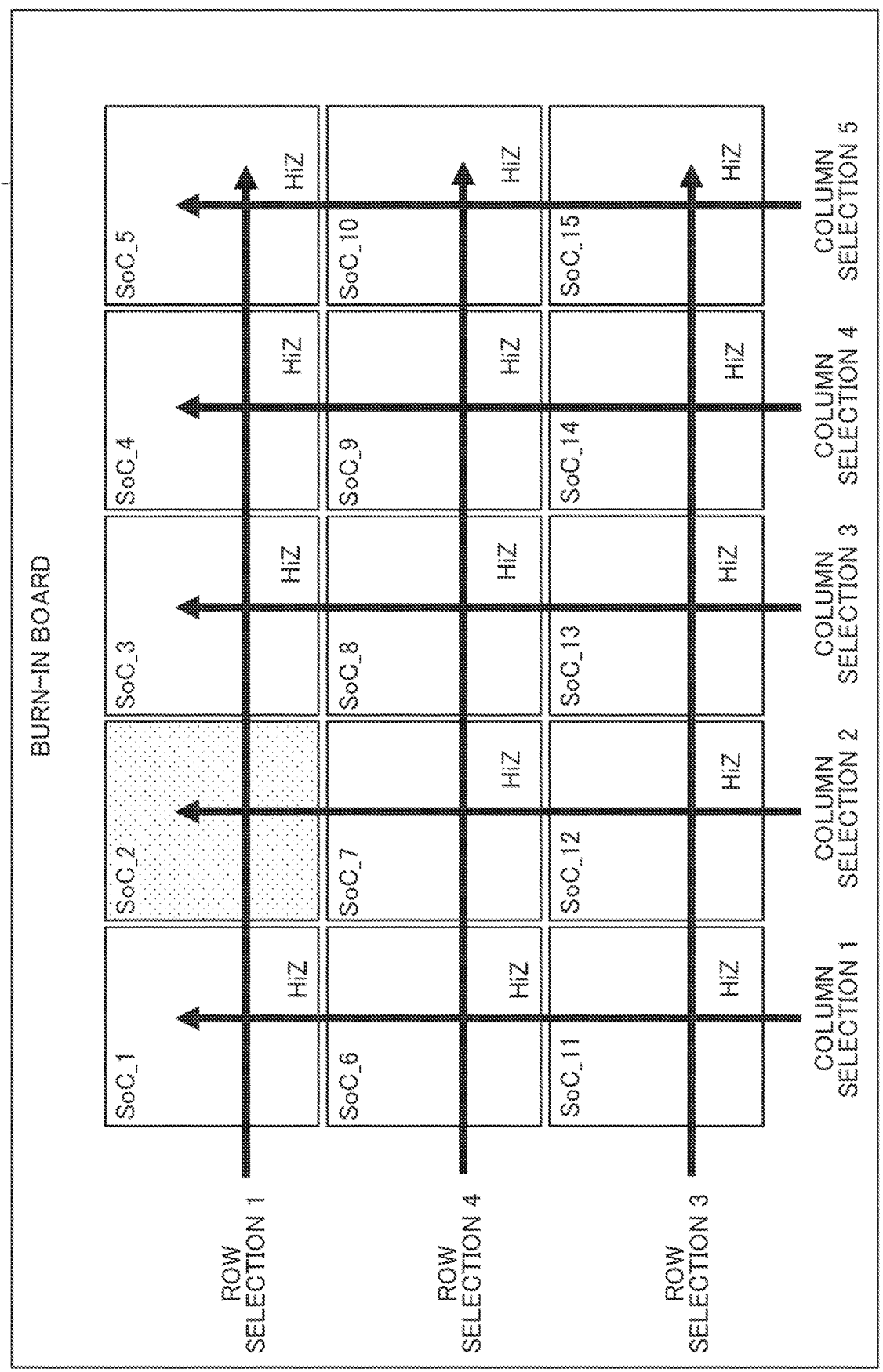
FIG. 6 is a schematic diagram illustrating an example of selecting a specific SoC from an SoC group in which control lines and data lines are shared, in the diagnostic system of the burn-in board according to the embodiments.

For the pin of the SoC 110 connected to the burn-in socket 130, the electrical quantity can be measured from the contact unit 400 by using the same processing operation as those illustrated in FIGS. 5 to 7.

Even if trying to measure the electrical quantity of the burn-in socket 130-side pins of the SoC 110 from the burn-in apparatus 200 side through the burn-in terminal, for example, without arranging the measuring instrument terminal 120 for connecting the contact unit 400 between the SoC 110 and the burn-in socket 130, it is difficult to execute measurement between the SoC 110 and the burn-in socket 130, which operate at high speed. More specifically, since even if trying to measure, from the burn-in apparatus 200 side, the electrical quantity of the burn-in socket 130-side pin of the SoC 110, the contact resistance of the burn-in socket 130 is also included in the measured value, it is impossible to inspect performance degradation degree of the SoC 110 itself.

In contrast, in the example illustrated in FIG. 9, since the measuring instrument terminal 120 for connecting the contact unit 400 between the SoC 110 and the burn-in socket 130 is arranged similarly to the layout example illustrated in FIG. 3, it is possible to accurately measure the electrical quantity of only the SoC 110.

In addition, the second metallic terminal group 122 in the measuring instrument terminal 120, as in the example layout illustrated in FIG. 2, can be used to accurately measure the electrical quantity of only the SoC 110 in the same way.

(Contact Configuration Example Between Contact Unit and Measuring Instrument Terminal)

Figure 10:
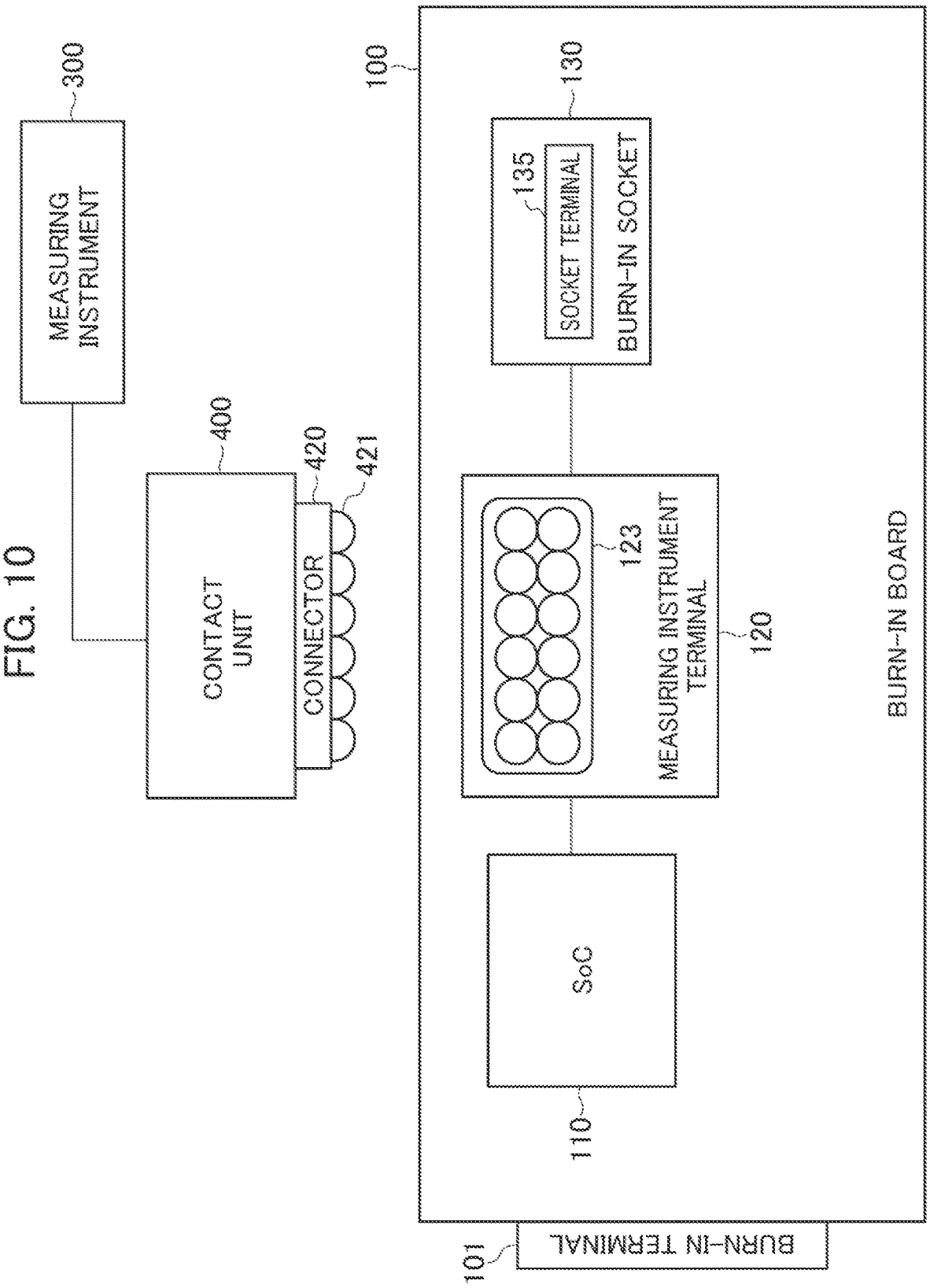
FIG. 10 is a block diagram illustrating an example of a contact configuration between a contact unit and a measuring instrument terminal, in the diagnostic system of the burn-in board according to the embodiments.

FIG. 10 illustrates an example of a contact configuration between the contact unit 400 and the measuring instrument terminal 120, in the diagnostic system according to the embodiments.

In the example illustrated in FIG. 10, the connector 420 portion of the contact unit 400 is constituted of a spring-loaded pin connector 421, and the measuring instrument terminal 120 is constituted of a pin pad 123. The spring-loaded pin type contact structure includes, for example, a pogo contact structure. The pogo contact structure is generally a three-piece pogo pine structure, having a spring between two pins, and three-piece parts are all metal capable of being connected to be energized.

By adopting the spring-loaded pin type contact structure into the contact configuration between the contact unit 400 and the measuring instrument terminal 120, it is possible to connect the contact unit 400 to the measuring instrument terminal 120 only during the diagnostics of the burn-in board. Therefore, it is possible to remove a stub and a capacitive load, which obstructs high-speed testing when executing a normal burn-in test. In other words, if a spring-loaded pin type contact structure is used to contact the electrical path between the SoC 110 and the burn-in socket 130, the electrical path from the pin pad 123, which is a metal terminal provided on the board of the burn-in board 100, to the measuring instrument 300 side, it becomes a stub. In contrast, as illustrated in FIG. 10, since the spring-loaded pin connector 421 of the contact unit 400 can be disconnected from the pin pad 123 of the measuring instrument terminal 120, the signal quality is not affected when actually testing the burn-in socket 130 from the SoC 110.

Figure 11:
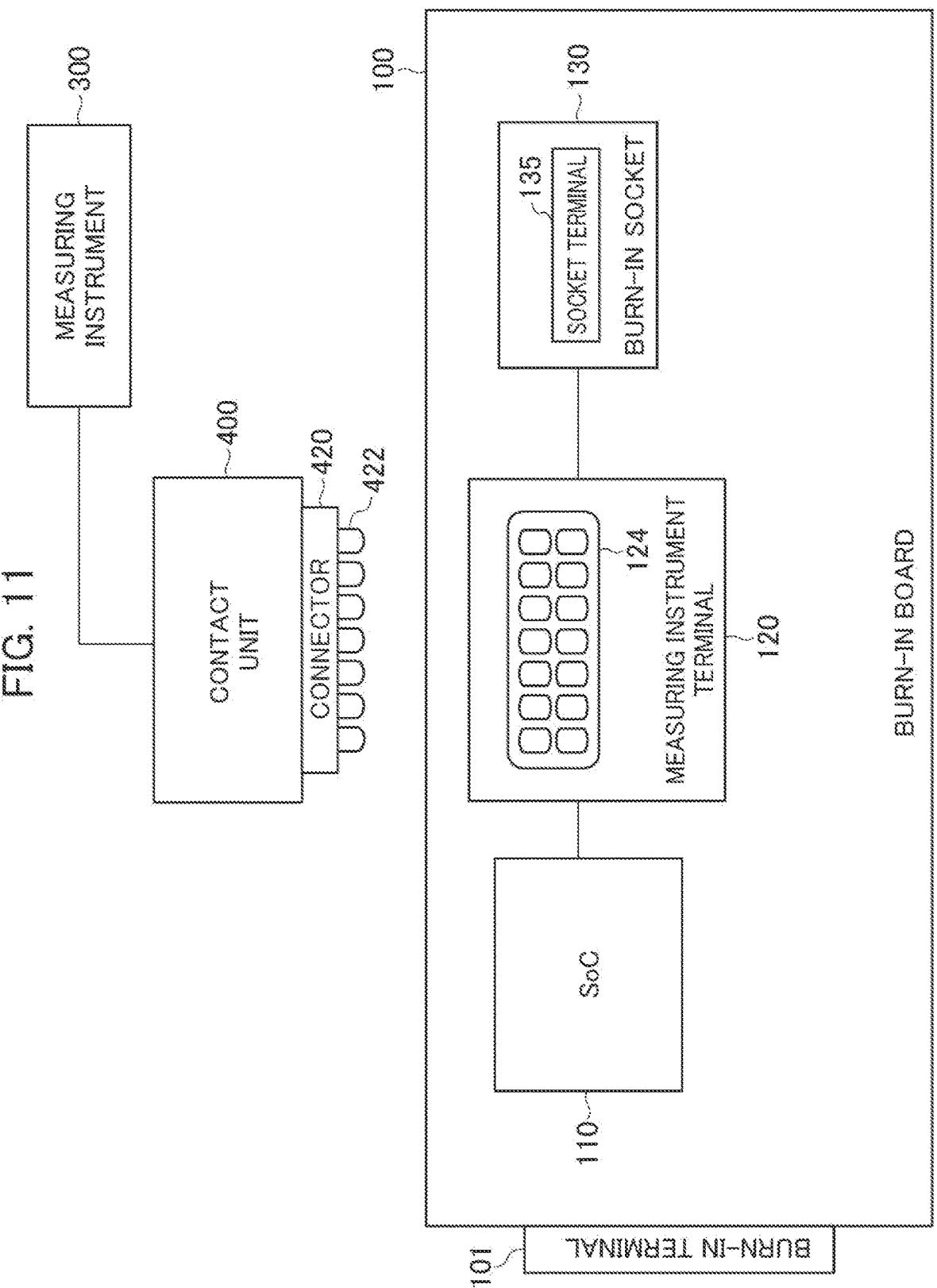
FIG. 11 is a block diagram illustrating another example of the contact configuration between the contact unit and the measuring instrument terminal, in the diagnostic system of the burn-in board according to the embodiments.

FIG. 11 illustrates another example of the contact configuration between the contact unit 400 and the measuring instrument terminal 120, in the diagnostic system according to the embodiments. In the example illustrated in FIG. 11, the connector 420 portion of the contact unit 400 is constituted of a male connector 422, and the measuring instrument terminal 120 is constituted of a female connector 124.

In the case of the spring-loaded pin-type contact structure illustrated in FIG. 10, the contact thereof requires a high degree of accuracy, leading to increased costs for the diagnostic system.

In contrast, if the frequency of the high-speed test of the SoC 110 is low, it is also possible to adopt the connector connection structure that does not require relatively high contact accuracy by mounting connecting components, such as a connector, on the substrate of the burn-in board 100, as illustrated in FIG. 11.

(Example of Parallel Operation of Burn-In Board Diagnostics)

Figure 12:
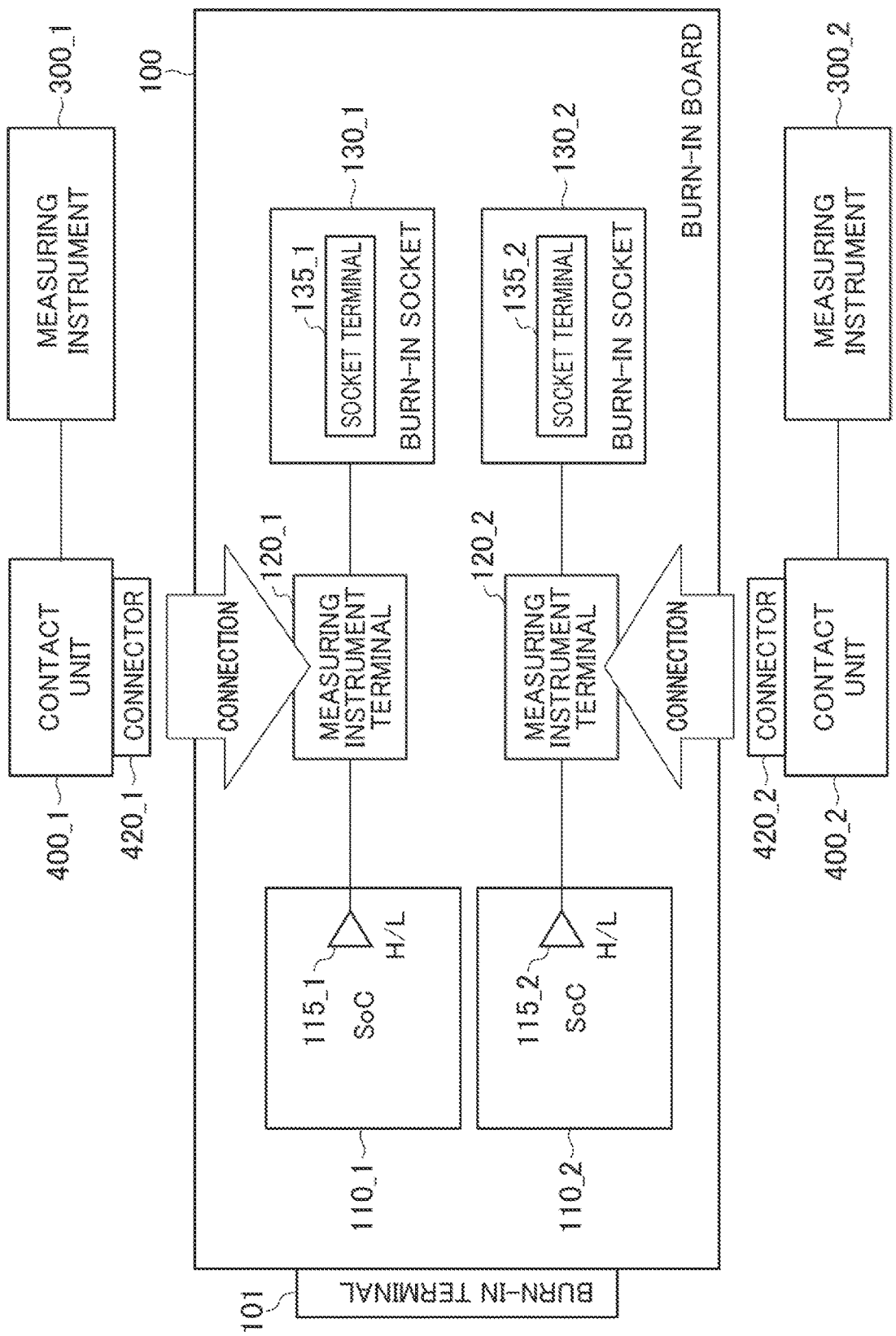
FIG. 12 is a block diagram illustrating a processing operation example of measuring an electrical quantity of burn-in socket-side pins of a plurality of SoCs in parallel, in the diagnostic system of the burn-in board according to the embodiments.

FIG. 12 illustrates an example of measuring in parallel an electrical quantity of the burn-in sockets 130_1 to 130_2-side pins of a plurality of SoC 110_1 to SoC 110_2, in the diagnostic system according to the embodiments.

In the example illustrated in FIG. 12, a contact unit 400_1 to which a measuring instrument 300_1 is connected is connected to a measuring instrument terminal 120_1 corresponding to an SoC 110_1, and an electrical quantity of a burn-in socket 130_1-side pin of the SoC 110_1 is measured. Similarly, a contact unit 400_2 to which a measuring instrument 300_2 is connected is connected to a measuring instrument terminal 120_2 corresponding to an SoC 110_2, and an electrical quantity of a burn-in socket 130_2-side pin of the SoC 110_2 is measured. Consequently, the electrical quantity of each of the burn-in sockets 130_1 to 130_2-side pins of the plurality of SoCs 110_1 to 110_2 can be measured in parallel.

When diagnosing a plurality of diagnostic target SoCs 110_1 to 110_2 by switching therebetween, it is conceivable that the test time will increase if the measurements are sequentially executed.

Therefore, as illustrated in FIG. 12, the plurality of measuring instruments 300_1 to 300_2, the plurality of contact units 400_1 to 400_2, and the plurality of measuring instrument terminals 120_1 to 120_2 are prepared respectively, thereby increasing the number of burn-in boards 100 that can be diagnosed simultaneously. In particular, since the burn-in socket 130-side pins of the SoCs 110 is connected one-to-one, it is suitable for parallel measurements.

(Example of Diagnostics of Socket Contact)

The diagnostic system according to the embodiments can also detect a degree of degradation of contact performance of the burn-in socket 130 mounted on the burn-in board 100.

Figure 13:
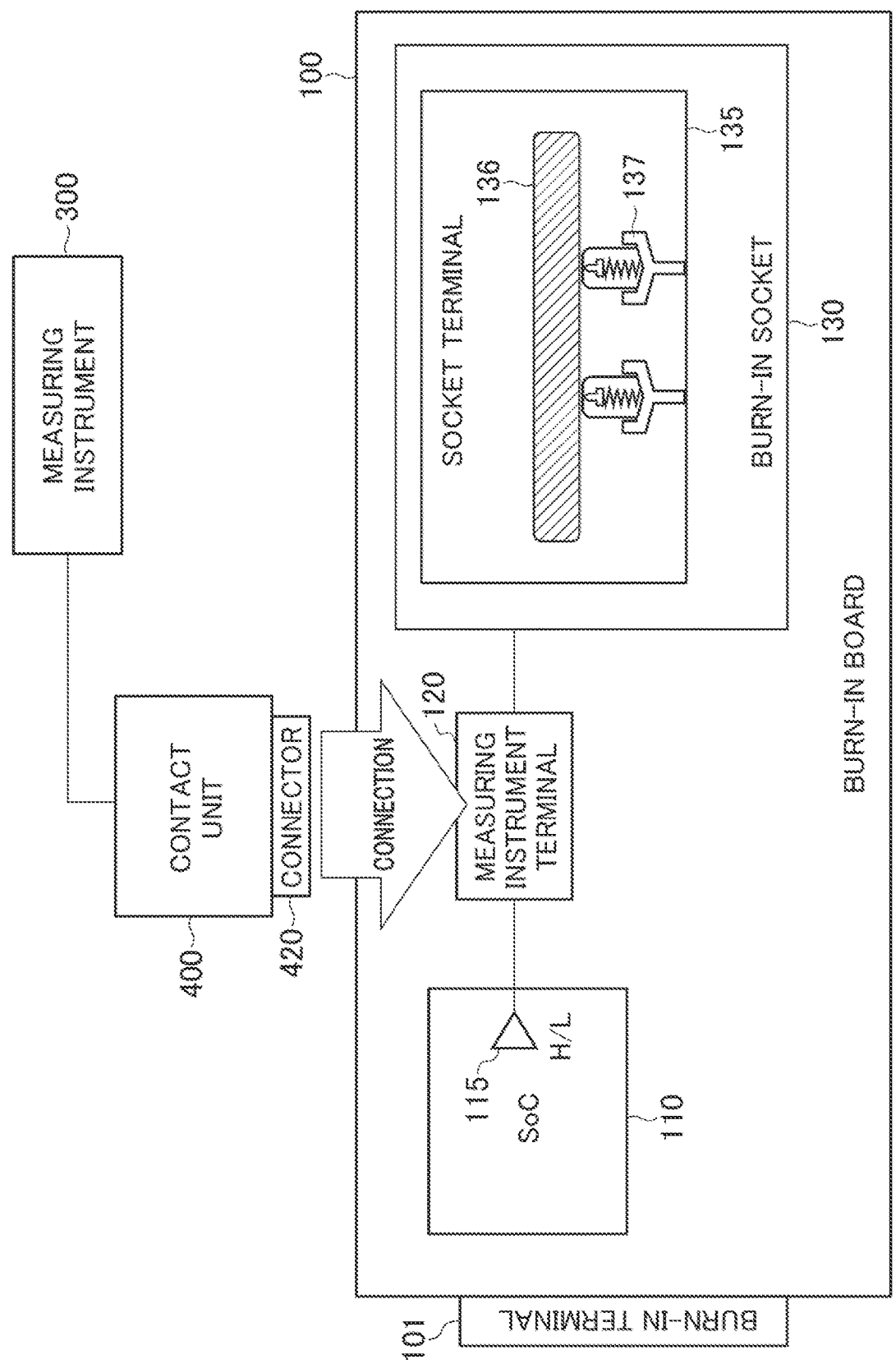
FIG. 13 is a block diagram for illustrating an example of a degradation degree measurement of a socket contact resistance in the burn-in socket, in the diagnostic system of the burn-in board according to the embodiments.

As illustrated in FIG. 13, the contact performance of the burn-in socket 130 can be inspected by providing an electrode plate 136 which sets a signal pin 137 of the burn-in socket 130 to a specific electric potential. For example, the electrode plate 136 which short-circuits the signal pin 137 to the ground (GND) is inserted into the burn-in socket 130, the target signal pin 137 is connected to the GND, and a voltage is applied from the measuring instrument 300 through the contact unit 400, thereby measuring a flowing electric current. As a result, the contact resistance of the burn-in socket 130 can be calculated. For example, if the contact resistance at the side of the burn-in socket 130 is measured by burn-in board diagnostics periodically executed, a degree of aging degradation of the burn-in socket 130 can be inspected. FIG. 13 illustrates an example of the signal pin 137 that is a pogo pin.

Moreover, the diagnostic system according to the embodiments is capable of an initial test or mount check of the DUT. Furthermore, pass or failure of the DUT can be determined on the basis of test results of the DUT.

Specifically, as illustrated in FIG. 13, the initial measurement and the mount check of the DUT mounted on the burn-in board 100 (e.g., test for verifying whether or not the DUT is inserted into the burn-in socket 130) can also be executed from the measuring instrument 300 through the contact unit 400.

For example, since there is no electrical connection path from the burn-in apparatus 200 side to the burn-in socket 130 even if trying to execute a mount check of the DUT through the burn-in terminal 101 from the burn-in apparatus 200 side, the check cannot be executed. Moreover, if performance diagnostics of the SoC 110 is executed without using the contact unit 400 and the measuring instrument 300, it is also possible to execute a high-speed test for the SoC 110 from the burn-in socket 130 side. However, since the SoC 110 and the burn-in socket 130 are included in the diagnostic path, it is not possible to determine whether it is the SoC 110 or the burn-in socket 130 that is degrading performance when the test result is fail.

In contrast, according to the embodiments, since the measuring instrument 300 can be connected to the burn-in board 100, it is possible to measure DC failure of the DUT and diagnose pass or failure of insertion of the DUT in a state of DUT being inserted into the burn-in socket 130, before setting the burn-in board 100 in the burn-in apparatus 200.

(Relay Circuit)

Figure 14:
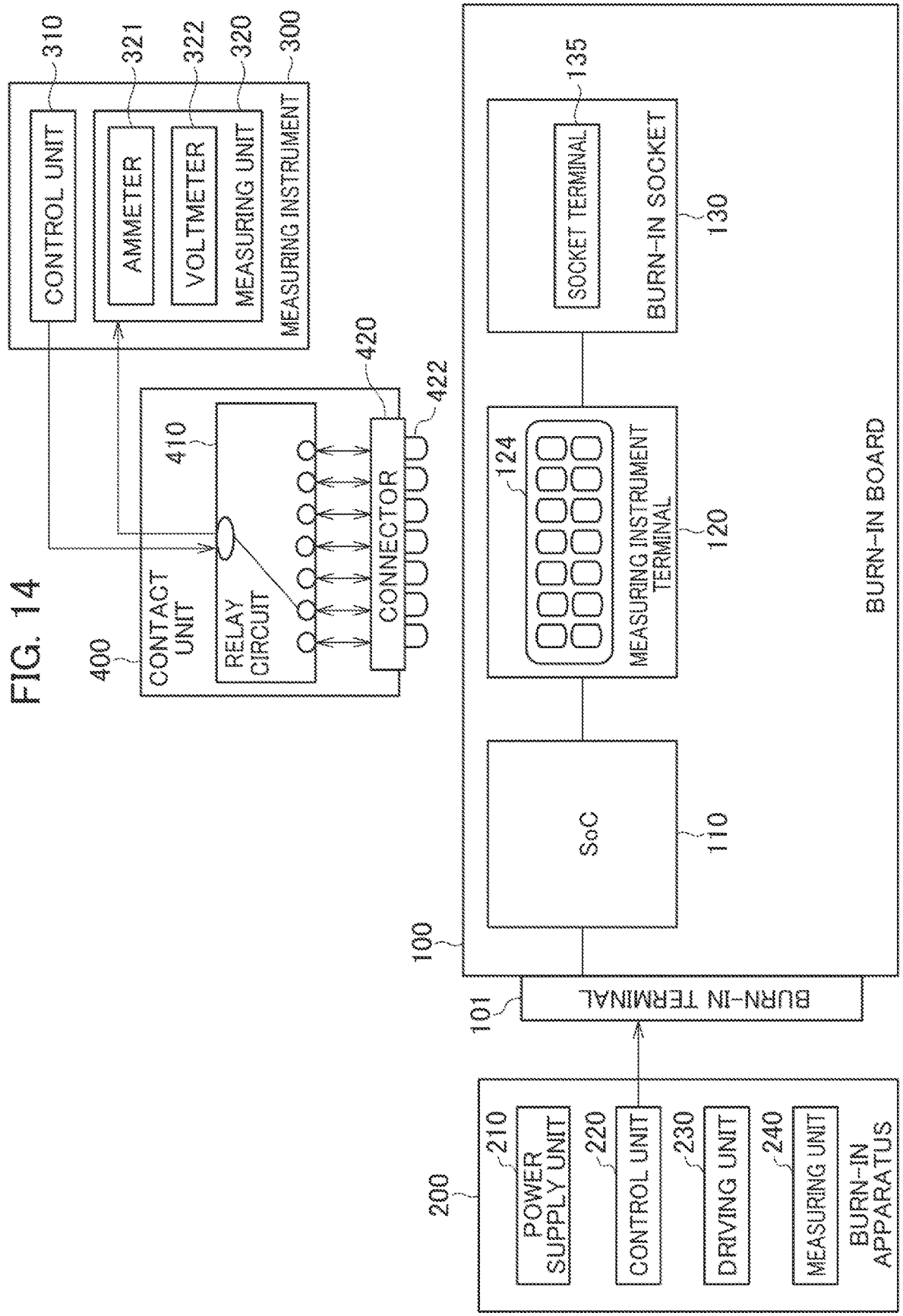
FIG. 14 is a block diagram illustrating an example of a relay circuit provided in a contact unit, in the diagnostic system of the burn-in board according to the embodiments.

FIG. 14 illustrates an example of a relay circuit 410 provided in the contact unit 400, in the diagnostic system according to the embodiments.

The relay circuit 410 is provided in the contact unit 400. The relay circuit 410 is disposed immediately after the connector 420, and therefore it is possible to switch a connection between a cable connected to the measuring instrument 300 and a side of the measuring instrument terminal 120.

The relay circuit 410 can be controlled from the measuring instrument 300 side if the measuring instrument 300 is a tester or the like. However, even if it cannot be controlled from the measuring instrument 300 side, it can also be controlled through the burn-in board 100 from burn-in apparatus 200 when the measuring instrument terminal 120 is in contact with the contact unit 400.

EFFECTS PRODUCED FROM THE EMBODIMENTS

According to the embodiments, the following effects can be obtained.

It is possible to diagnose the SoC 110 mounted on the burn-in board 100. Diagnostics of a plurality of SoCs 110 mounted on the burn-in board 100 can be executed sequentially and step by step.

In particular, it is configured so that the measuring instrument 300 capable of electrical inspection can be connected at an immediate vicinity of the SoC 110 on the substrate of the SoC-mounted burn-in board 100, thereby accurately measuring the electrical quantity of only the SoC 110 by the measuring instrument 300.

Moreover, it is configured to disconnect each SoC 110 electrically even if the control and data lines of a plurality of SoCs 110 are shared, the electrical quantity of the individual SoC 110 can be accurately measured, and the functions of the SoC 110 can be accurately diagnosed.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

It is to be noted that the processing operations illustrated to FIG. 5 can also be described in a computer program as instructions to be executed by computers. The computer program is stored in, for example, a non-transitory computer-readable medium and is used for the diagnostic system according to the embodiments.

Moreover, the diagnostic system according to the embodiments may include an insertion and removal apparatus configured to insert/remove the DUTs respectively into/from the burn-in socket input/output terminals 135 of the burn-in socket 130. The burn-in socket input/output terminals 135 can be connected to the insertion and removal apparatus configured to insert/remove the DUTs respectively into/from to the burn-in socket input/output terminal 135.

What is claimed is:

1. A test board on which a test executable integrated circuit is mounted, the test executable integrated circuit being configured to execute a test of a device under test, and the test board comprising:
   a first input/output terminal for connecting a first measuring apparatus capable of supplying electric power to the test board and controlling the test executable integrated circuit;
   a second input/output terminal for connecting a second measuring apparatus capable of measuring electrical characteristics of the test executable integrated circuit; and
   a contact unit mounted on the test board through the second input/output terminal and configured to electrically connect the second measuring apparatus.

2. The test board according to claim 1, wherein the second input/output terminal is mounted on a substrate surface of the test board, and comprises a metallic terminal electrically connected to a mounted pin of the test executable integrated circuit.

3. The test board according to claim 2, wherein the mounted pin comprises all pins of the test executable integrated circuit.

4. The test board according to claim 1, further comprising a third input/output terminal mounted on a substrate surface of the test board and connecting the test executable integrated circuit and the second input/output terminal.

5. The test board according to claim 1, wherein a mounted pin of the test executable integrated circuit is connected to a tri state buffer.

6. The test board according to claim 1, wherein the contact unit is configured to connect/disconnect all pins of the test executable integrated circuit to/from the second measuring apparatus.

7. The test board according to claim 4, wherein the test executable integrated circuit is configured to be electrically inspected by, in a state in which the device under test is not inserted in the third input/output terminal, inputting a test signal for testing the device under test from the second measuring apparatus to the test executable integrated circuit, and detecting a result by the second measuring apparatus to determine pass/fail of the test executable integrated circuit.

8. The test board according to claim 1, wherein a plurality of second measuring apparatuses respectively corresponding to a plurality of test executable integrated circuits mounted on the test board are electrically connected via a plurality of second input/output terminals and a plurality of contact units, and the plurality of test executable integrated circuits are electrically inspected simultaneously.

9. The test board according to claim 4, further comprising an electrode for short-circuiting each pin of the third input/output terminal to a ground,
wherein contact performance of the third input/output terminal is inspected by connecting the pin to the ground and applying a voltage from the second measuring apparatus through the contact unit to measure a flowing electric current.

10. The test board according to claim 4, wherein the third input/output terminal is connectable to an insertion and removal apparatus configured to insert/remove the device under test into/from the third input/output terminal.

11. The test board according to claim 7, wherein an initial test and a mount check of the device under test are executed by the second measuring apparatus through the contact unit in a state in which the device under test is inserted into the third input/output terminal.

12. The test board according to claim 1, wherein the test executable integrated circuit is mounted on the test board at a position corresponding to the device under test.

13. The test board according to claim 1, wherein pass/failure of the device under test is determined based on a test result of the device under test.

14. A diagnostic system of a test board, the diagnostic system comprising:
a test board;
a test executable integrated circuit mounted on the test board, the test executable integrated circuit being configured to execute a test of a device under test;
a first measuring apparatus capable of supplying electric power to the test board and controlling the test executable integrated circuit;
a second measuring apparatus capable of measuring electrical characteristics of the test executable integrated circuit; and
a contact unit mounted on the test board, the contact unit being configured to electrically connect the second measuring apparatus.

15. The diagnostic system according to claim 14, wherein the test board comprises a first input/output terminal for connecting the first measuring apparatus and a second input/output terminal for connecting the second measuring apparatus, and
wherein the second input/output terminal is mounted on a substrate surface of the test board, and comprises a metallic terminal electrically connected to a mounted pin of the test executable integrated circuit.

16. The diagnostic system according to claim 14, wherein the mounted pin comprises all pins of the test executable integrated circuit.

17. The diagnostic system according to claim 15, further comprising a third input/output terminal mounted on a substrate surface of the test board and connecting the test executable integrated circuit to the second input/output terminal.

18. The diagnostic system according to claim 14, wherein a mounted pin of the test executable integrated circuit is connected to a tri state buffer.

19. A diagnostic method of a test board on which a test executable integrated circuit is mounted, the test executable integrated circuit being configured to execute a test of a device under test, and the diagnostic method comprising:
connecting the test board to a first measuring apparatus;
supplying, by the first measuring apparatus, electric power to the test board, and controlling, by the first measuring apparatus, the test executable integrated circuit;
measuring, by second measuring apparatus, electrical characteristics of the test executable integrated circuit; and
mounting a contact unit configured to electrically connect the second measuring apparatus on the test board.

20. A non-transitory computer-readable medium storing a computer program thereon, the computer program being executable by a computer used for a diagnostic system for executing diagnostics of a test board, the test board having a test executable integrated circuit mounted thereon, the test executable integrated circuit being configured to execute a test of a device under test, and the computer program being executable to control the computer to control operations comprising:
connecting the test board to a first measuring apparatus;
supplying, by the first measuring apparatus, electric power to the test board, and controlling, by the first measuring apparatus, the test executable integrated circuit;
measuring, by second measuring apparatus, electrical characteristics of the test executable integrated circuit; and
mounting a contact unit configured to electrically connect the second measuring apparatus on the test board.

* * * * *